United States Patent Office 3,342,907
Patented Sept. 19, 1967

3,342,907
DIETHYL-N,N-DIETHYLTHIOCARBAMYL PHOSPHONATE
Ivan C. Popoff, Ambler, and John T. Massengale, West Chester, Pa., assignors to Pennsalt Chemicals Corporation, Philadelphia, Pa., a corporation of Pennsylvania
No Drawing. Filed Sept. 1, 1964, Ser. No. 393,728
1 Claim. (Cl. 260—944)

This invention relates to a specific dialkyl thiocarbamylphosphonate having unexpectedly high biological activity and particularly to diethyl N,N-diethylthiocarbamylphosphonate.

The compound of the present invention has the structural formula:

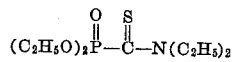

The compound may be prepared by either of two methods: the reaction of triethyl phosphite with N,N-diethylthiocarbamyl chloride or by reaction of diethyl hydrogen phosphite with sodium and subsequent reaction of the resulting sodium salt with N,N-diethylthiocarbamyl chloride. Direct reaction with triethylphosphite is illustrated in Example 1 and the two-step reaction with diethyl hydrogen phosphite is illustrated in Example 2.

In the direct reaction with triethyl phosphite approximately stoichiometric quantities of the triethyl phosphite and N,N-diethylthiocarbamyl chloride are employed. The reaction is completed in about 3.5 hours at 60–125° C. The ethyl chloride which is produced during the reaction can be continuously removed by conducting the reaction above the boiling point of ethyl chloride and can be recovered by condensation. Catalysts can be employed but are not necessary to the production of high yields of the materials. The diethyl N,N-diethylthiocarbamylphosphonate obtained from the reaction may be purified by distillation.

In the two-step production of the compound of the present invention, approximately stoichiometric quantities of diethyl hydrogen phosphite and sodium are reacted preferably in reaction media such as ethyl alcohol or benzene. The second stage of the reaction is conducted by adding approximately stoichiometric quantities of N,N-diethylthiocarbamyl chloride preferably in a solvent such as benzene to the residue from the preceding reaction. This mixture can then be refluxed until the reaction is substantially complete. The product can be purified by filtration or by washing the reaction mixture with water to remove the sodium chloride formed as a by-product, and subsequently distilling. The distillation residue is the product. Additional purification may be effected by further distillation of the crude product.

Examples 3, 4 and 5 demonstrate the unexpectedly high biological activity of the compound of the present invention as compared to two structurally similar compounds. In addition the compound has been found to be a valuable inhibitor of corrosion by acids, particularly hydrochloric acid on metals including steel and can also be employed as a gasoline and oil antioxidant.

The compound of the present invention can be employed as a pesticide either directly, undiluted, or in a variety of compositions both liquid and solid including liquid solutions, concentrates, emulsifiable concentrates, slurries, finely-divided powders, granular materials and pastes. The compound may be employed either alone in compositions as the essential pesticidal ingredient or with other pesticides. Useful compositions can also include as other ingredients diluents, extenders, fillers, conditioners, solvents and water. For example, compositions may include, in dust formulations, various clays, diatomaceous earth, talc, and powdered proteinaceous materials, such as powdered cereal wastes. Solvent compositions can include emulsions, suspensions or solution in inert organic carrier such as acetone, kerosene, benzene, toluene, xylene, various naphthas, including e.g. Stoddard solvent, and other petroleum distillate fractions or mixtures thereof. It will frequently be found desirable to use wetting or emulsifying dispersing agents to facilitate useful formulation and for this purpose non-ionic surfactants will generally be preferred.

The compound of this invention and formulations containing the compound as an essential pesticidal ingredient is preferably applied in liquid form, e.g. as an emulsion in water or a solution in a hydrocarbon oil. Such formulations will preferably contain at least about 0.005% and preferably from about 0.01% to about 15% of the compound of the present invention. The formulations to be applied in dust form will preferably contain 0.005% or more and most preferably will contain from about 1% to about 20% of the compound of the invention.

The compositions containing the compound of the invention can be applied directly to the locus to be protected. For example, the area around and on economic plants already infested with insects or to plants on which infestation is to be prevented. The compositions may be used either in direct contact or a systemic pesticide.

Where the plants are valuable economically the compositions can be applied in a nonphytotoxic amount, but where the plants are not valuable, higher amounts may be used. In general, a quantity from at least about 0.1 pound per acre and preferably from about 1.0 to about 100 pounds per acre is used on plants. However, in specialized instances substantially large amounts may be used.

The pesticidal properties of the present compound also extend to rodents and is valuable as a rodenticide.

PREPARATION OF THE DIETHYLTHIOCARBAMYLPHOSPHONATE

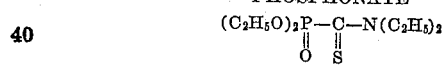

Example 1

A mixture of 0.52 mole of triethyl phosphite and of 0.5 mole of N,N-diethylthiocarbamyl chloride is heated for 3.5 hours at 80–125° C. while stirring until 100% of the theoretical amount of ethyl chloride is liberated. The reaction product is the crude diethyl N,N-diethylthiocarbamylphosphonate obtained in a yield of 98.7%. It was distilled to obtain a cut boiling at 135° C. at 3 min. having the following analysis:

Found: 43.0% C, 8.6% H, 4.8% N, 12.0% P. Calculated for $C_9H_{20}NO_3SP$: 42.7% C, 7.9% H, 5.5% N, 11.9% P.

Its infrared spectrum confirmed the structure of the product.

The product obtained in a second run under similar conditions analyzed as follows before distillation:

Found: 43.1% C, 8.5% H, 6.0% N, 13.3% P.

Example 2

A mixture of 1.1 mole of diethyl hydrogen phosphite, 1.1 mole Na in 500 cc. ethyl alcohol, and 1600 cc. benzene is distilled until all the ethyl alcohol is removed as an azeotropic mixture. A solution of 0.9 mole of N,N-diethylthiocarbamyl chloride in 350 cc. benzene is added to the residue over a 60–70 minute period while stirring and holding the pot temperature at 65–75° C. Then the reaction mixture is refluxed for an additional 30 minutes while stirring. After cooling it is shaken with 1000 cc. of water and the benzene layer is dried with sodium sulfate and distilled (at the end, in vacuo) in order to remove the solvent. The residue is the crude diethyl N,N-diethylthiocarbamylphosphonate obtained in a yield of 72%. The infrared spectrum of this product was the same as that of the distilled product obtained in Example 1. The product is a liquid having an onion-like odor and being water insoluble but ethanol soluble.

*Example 3*

When the compound of the present invention is used as a pesticide by incorporating it into an acetone emulsion and applying as a spray, the results on various pests are as outlined below:

| Method of application | Pest | Dosage level | Insect mortality after 24 hours |
|---|---|---|---|
| Contact | House fly | 3.125 mg./ml | 100 ([1] 58) |
| Do | Mites | 0.5% | 97 |
| Residual-type surface coating | House fly | 100 mg./square foot | 92 ([1] 35) |

[1] The figures in parenthesis indicate the percent mortality after 24 hours using DDT, in identical tests, at identical dosage levels.

*Example 4*

When diisopropyl N,N-diethylthiocarbamyl phosphonate prepared by the method described in Example 1, by using triisopropyl phosphite instead of triethyl phosphite, is tested for biological activity as in Example 3, the percent mortality at identical dosage levels after twenty-four hours is 62% for house flies and 10% for mites, indicating a much lower pesticidal activity than that exhibited by the compound of the present invention.

*Example 5*

When dimethyl N,N-diethylthiocarbamylphosphonate, is tested identically to the procedures of Example 3, the percent mortality after twenty-four hours is found to be 6% for house flies and 10% for mites, indicating much lower pesticidity activity than the diethyl N,N-diethylthiocarbamylphosphonate of the present invention.

*Example 6*

When the compound of the present invention is tested as a rodenticide according to conventional methods of inducing ingestion by rats, the dosage which is lethal to 50% of the rats ingesting it is found to be approximately 17 milligrams per kilogram of body weight.

It should be understood that the present invention is capable of a wide variety of modifications and variations, all of which are within the scope of the invention and that the above examples are to be taken as merely illustrative of the invention and as not limiting it in any manner or to any degree.

We claim:

A compound of the formula

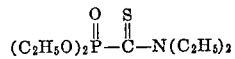

$$(C_2H_5O)_2\overset{O}{\underset{\|}{P}}-\overset{S}{\underset{\|}{C}}-N(C_2H_5)_2$$

No references cited.

CHARLES B. PARKER, *Primary Examiner.*

A. H. SUTTO, *Assistant Examiner.*